US012196162B1

(12) United States Patent
Riley

(10) Patent No.: US 12,196,162 B1
(45) Date of Patent: Jan. 14, 2025

(54) SYSTEM AND METHOD OF HYDROGEN FUEL INJECTION

(71) Applicant: Astron Aerospace LLC, Derby, KS (US)

(72) Inventor: Matthew T. Riley, Wichita, KS (US)

(73) Assignee: ASTRON AEROSPACE LLC, Derby, KS (US)

(*) Notice: Subject to any disclaimer, the term of this patent is extended or adjusted under 35 U.S.C. 154(b) by 0 days.

(21) Appl. No.: 17/986,711

(22) Filed: Nov. 14, 2022

Related U.S. Application Data

(60) Provisional application No. 63/279,163, filed on Nov. 14, 2021.

(51) Int. Cl.

*F02M 21/00* (2006.01)
*F02M 21/02* (2006.01)
*F02M 47/06* (2006.01)
*F02M 51/00* (2006.01)
*F02M 51/04* (2006.01)
*F02M 51/06* (2006.01)

(52) U.S. Cl.

CPC .......... *F02M 47/06* (2013.01); *F02M 21/023* (2013.01); *F02M 21/0254* (2013.01); *F02M 21/0263* (2013.01); *F02M 51/00* (2013.01); *F02M 51/04* (2013.01); *F02M 51/06* (2013.01); *F02M 51/0607* (2013.01); *F02M 51/0642* (2013.01); *F02M 51/0653* (2013.01); *F02M 2200/16* (2013.01)

(58) Field of Classification Search

CPC ............. F02M 21/023; F02M 21/0254; F02M 21/0263; F02M 21/0293; F02M 51/00; F02M 51/06; F02M 51/0642; F02M 51/0653; F02M 2200/16

See application file for complete search history.

(56) References Cited

U.S. PATENT DOCUMENTS

| | | | |
|---|---|---|---|
| 465,907 | A | 12/1891 | Whipple |
| 600,723 | A | 3/1898 | Johnson |
| 621,193 | A | 3/1899 | Wilson |
| 711,083 | A | 10/1902 | Taylor |
| 717,445 | A | 12/1902 | Nestius |
| 726,896 | A | 5/1903 | Franzen |
| 761,512 | A | 5/1904 | Lecomte |
| 822,700 | A | 6/1906 | Steele |
| 830,124 | A | 9/1906 | Weeks |

(Continued)

FOREIGN PATENT DOCUMENTS

| | | | |
|---|---|---|---|
| CN | 102428259 | A | 4/2012 |
| CN | 112912601 | A | 6/2021 |

(Continued)

OTHER PUBLICATIONS

"Commercial Aviation Safety Team: CAST;"Fundamentals of Gas Turbine Engines"", https://www.cast-safety.org/pdf/3_engine_fundamentals.pdf; last accessed Apr. 16, 2020.

(Continued)

*Primary Examiner* — Erick R Solis
(74) *Attorney, Agent, or Firm* — Kutak Rock LLP

(57) ABSTRACT

A fuel injection system is provided. The system includes a completely sealed housing surrounding the key components of the fuel injection system.

20 Claims, 1 Drawing Sheet

(56) References Cited

U.S. PATENT DOCUMENTS

| | | | | |
|---|---|---|---|---|
| 868,841 | A | 10/1907 | Calkins | |
| 888,806 | A | 5/1908 | Hopkins | |
| 909,774 | A | 1/1909 | Flora | |
| 983,754 | A | 2/1911 | Nichols | |
| 994,825 | A | 6/1911 | Dunbar | |
| 1,052,045 | A | 2/1913 | Doedyns | |
| 1,078,301 | A | 11/1913 | Moore | |
| 1,098,256 | A | 5/1914 | Harper | |
| 1,229,949 | A | 6/1917 | Harrigan | |
| 1,242,826 | A | 10/1917 | Llewellyn | |
| 1,277,018 | A | 8/1918 | Wolfington | |
| 1,320,892 | A | 11/1919 | Munn | |
| 1,376,397 | A | 5/1921 | Bylger | |
| 1,406,140 | A | 2/1922 | Julius | |
| 1,488,528 | A | 4/1924 | Luigi | |
| 1,567,912 | A | 12/1925 | Falkland | |
| 1,737,942 | A | 12/1929 | Pagel | |
| 1,850,904 | A | 3/1932 | Woodward | |
| 1,872,361 | A | 8/1932 | John | |
| 2,168,726 | A | 8/1939 | Frank | |
| 2,297,529 | A | 9/1942 | Frank | |
| 2,367,676 | A | 1/1945 | Griffith | |
| 2,447,929 | A | 8/1948 | Frank | |
| 2,478,206 | A | 8/1949 | Redding | |
| 2,504,414 | A | 4/1950 | Hawthorne | |
| 2,505,660 | A | 4/1950 | Baumann | |
| 2,526,409 | A | 10/1950 | Price | |
| 2,526,941 | A | 10/1950 | Fishbein | |
| 2,541,098 | A | 2/1951 | Redding | |
| 2,614,503 | A | 10/1952 | Berry | |
| 2,636,480 | A | 4/1953 | Becker | |
| 2,702,985 | A | 3/1955 | Raymond | |
| 2,817,322 | A | 12/1957 | Ralph | |
| 2,920,610 | A | 1/1960 | Breelle | |
| 3,153,907 | A | 10/1964 | Griffith | |
| 3,203,406 | A | 8/1965 | Georges | |
| 3,435,808 | A | 4/1969 | Allender | |
| 3,550,565 | A | 12/1970 | Sanchez | |
| 3,674,960 | A | 7/1972 | Krantz | |
| 3,797,237 | A | 3/1974 | Kamiya | |
| 3,863,609 | A | 2/1975 | Ikarashi | |
| 4,053,136 | A * | 10/1977 | Perl | F23N 5/047 236/101 E |
| 4,144,004 | A | 3/1979 | Edwards | |
| 4,169,451 | A | 10/1979 | Niggemeyer | |
| 4,432,314 | A | 2/1984 | Pelekis | |
| 5,596,963 | A | 1/1997 | Lai | |
| 5,996,965 | A * | 12/1999 | Eichholz | F16K 31/402 251/30.05 |
| 6,129,067 | A | 10/2000 | Riley | |
| 6,250,602 | B1 * | 6/2001 | Jansen | F02K 9/58 251/903 |
| 6,321,713 | B1 | 11/2001 | Mallen | |
| 6,394,775 | B1 | 5/2002 | White | |
| 6,488,004 | B1 | 12/2002 | Adamovski | |
| 6,672,274 | B2 | 1/2004 | Winterpacht | |
| 7,682,139 | B2 | 3/2010 | Riley et al. | |
| 7,713,042 | B1 | 5/2010 | Rodgers | |
| RE41,373 | E | 6/2010 | Gehman | |
| 8,517,706 | B2 | 8/2013 | Lurtz | |
| 8,616,176 | B2 | 12/2013 | Jacobsen et al. | |
| 9,091,201 | B1 | 7/2015 | Kristani | |
| 9,334,793 | B1 | 5/2016 | Marc | |
| 10,094,218 | B1 | 10/2018 | Hartmans | |
| 10,145,243 | B2 | 12/2018 | Ribbens et al. | |
| 10,844,782 | B1 | 11/2020 | Riley | |
| 11,352,975 | B1 * | 6/2022 | Pursifull | F02M 51/061 |
| 11,384,684 | B2 | 7/2022 | Riley | |
| 11,788,462 | B2 | 10/2023 | Riley | |
| 12,163,461 | B2 | 12/2024 | Riley | |
| 2001/0035163 | A1 * | 11/2001 | Rahardja | F02M 21/0254 123/467 |
| 2003/0084882 | A1 * | 5/2003 | Kabat | F02M 51/0671 123/499 |
| 2005/0081818 | A1 | 4/2005 | Mueller | |
| 2005/0235949 | A1 * | 10/2005 | Okada | F02M 61/10 123/294 |
| 2006/0120910 | A1 | 6/2006 | Lurtz | |
| 2006/0150946 | A1 | 7/2006 | Wright | |
| 2009/0174290 | A1 * | 7/2009 | Cooke | H10N 30/88 310/344 |
| 2009/0255506 | A1 | 10/2009 | Walker | |
| 2009/0308347 | A1 | 12/2009 | Hathaway et al. | |
| 2010/0116241 | A1 | 5/2010 | Mistry | |
| 2010/0219360 | A1 * | 9/2010 | Mumford | F02M 61/168 251/12 |
| 2011/0041933 | A1 * | 2/2011 | Pisot | F02M 21/0236 137/561 R |
| 2011/0259296 | A1 | 10/2011 | Jacobsen et al. | |
| 2013/0139785 | A1 | 6/2013 | Shkolnik et al. | |
| 2013/0327291 | A1 | 12/2013 | Pett, Jr. | |
| 2013/0336829 | A1 | 12/2013 | Steinbauer et al. | |
| 2014/0238337 | A1 | 8/2014 | Hruschka et al. | |
| 2014/0245988 | A1 | 9/2014 | Villeneuve et al. | |
| 2014/0261290 | A1 | 9/2014 | Herbruck et al. | |
| 2015/0308272 | A1 | 10/2015 | Rolus Borgward | |
| 2018/0073658 | A1 * | 3/2018 | Ramsperger | F16K 31/082 |
| 2020/0378348 | A1 * | 12/2020 | Zhang | F02M 51/0653 |
| 2021/0040885 | A1 | 2/2021 | Riley | |
| 2022/0056802 | A1 | 2/2022 | Riley | |
| 2023/0092617 | A1 | 3/2023 | Riley | |

FOREIGN PATENT DOCUMENTS

| | | | |
|---|---|---|---|
| CN | 112912601 | B | 9/2023 |
| CN | 117090708 | A | 11/2023 |
| DE | 724091 | C | 8/1942 |
| DE | 736114 | C | 6/1943 |
| EP | 4010573 | A1 | 6/2022 |
| HK | 40075725 | A | 1/2023 |
| ID | 2022/02753 | | 6/2022 |
| IN | 202037020268 | A | 7/2021 |
| JP | 2009-545699 | A | 12/2009 |
| JP | 2022-544188 | A | 10/2022 |
| KR | 10-20190130934 | A | 11/2019 |
| KR | 10-2022-0042039 | A | 4/2022 |
| MX | a/2022/001579 | | 7/2022 |
| RU | 2316660 | C2 | 2/2008 |
| RU | 2325542 | C2 | 5/2008 |
| RU | 2551718 | C2 | 5/2015 |
| TH | 2201000799 | A | 5/2023 |
| TW | 202106966 | A | 2/2021 |
| WO | 2012159637 | A2 | 11/2012 |
| WO | 2018187811 | A1 | 10/2018 |
| WO | 2021029906 | A1 | 2/2021 |
| WO | 2022026777 | A2 | 2/2022 |
| WO | 2022096868 | A1 | 5/2022 |
| WO | 2022026777 | A3 | 6/2022 |

OTHER PUBLICATIONS

"Corrected Notice of Allowability Received for U.S. Appl. No. 16/732,318, mailed on Jun. 13, 2022".

"Corrected Notice of Allowability Received for U.S. Appl. No. 16/732,318, mailed on Mar. 25, 2022.".

"Corrected Notice of Allowability received for U.S. Appl. No. 16/732,318, Mailed on May 12, 2022.".

"Final Office Action Received for U.S. Appl. No. 16/732,318, mailed on Aug. 12, 2021".

"First Office Action received for China Application No. 202080000213.8 , dated Feb. 22, 2022.".

"International Preliminary Report on Patentability for International Application PCT/US2020/013933, Report issued Feb. 3, 2022, Mailed on Feb. 17, 2022.".

"International Search Report and Written Opinion for International Application No. PCT/US2020/013933, Search completed Jun. 9, 2020, Mailed Jun. 9, 2020.".

"International Search Report and Written Opinion for International Application No. PCT/US2021/043801, Search completed on May 3, 2022 Mailed on May 3, 2022.".

(56) References Cited

OTHER PUBLICATIONS

"Karim Nice, How Rotary Engines Work, Feb. 9, 2021".
"Non-Final Action received for U.S. Appl. No. 16/732,318, Mailed on Feb. 1, 2021".
"Non-Final Office Action received for U.S. Appl. No. 17/389,239, Mailed on Aug. 12, 2022".
"Non-Final Office Action Received for Application No. 16/745,184, Mailed on Jun. 23, 2020".
"Notice of Allowance received for US Application No. 16/745,184, Mailed on Oct. 8, 2020.".
"Notice of Allowance received for U.S. Appl. No. 16/732,318, Mailed on Mar. 2, 2022".
"Notice of Decision to Grant Received for South Africa Patent Application No. 2022/02809, Mailed on Sep. 26, 2022.".
"Restriction Requirement Received for U.S. Appl. No. 17/389,239, mailed on Apr. 19, 2022.".
"Restriction Requirement Received for U.S. Appl. No. 16/732,318, mailed on Nov. 23, 2020.".
"Second Office Action received for China Patent Application No. 202080000213.8 , Mailed on Sep. 14, 2022.".
Clark, John M, et al., "For Industry: Gas Turbine vs. Reciprocating Naval Engineers Journal; Feb. 1967; vol. 79, Issue 1 (pp. 103-106)".
"Restriction Requirement Received for U.S. Appl. No. 17/862,172, mailed on Feb. 24, 2023.".
"Final Office Action received for U.S. Appl. No. 17/862,172, Mailed on Dec. 22, 2023".
"Non-Final Office Action received for U.S. Appl. No. 17/862,172, Mailed on May 30, 2023".
"Decision of Rejection Received for Japan Patent Application No. 2022-507795, Mailed on Jan. 31, 2024.".
"Decision on Final Rejection Received for Korean Patent Application No. 10-2020-7006369, Mailed on Jul. 3, 2023.".
"Examination Report Received for Taiwan Application No. 109103549 mailed on Oct. 6, 2023.".
"Extended European Search Report Received for European Patent Application No. 20853437.0, Search completed on Jul. 25, 2023, Mailed on Aug. 3, 2023.".
"International Preliminary Report on Patentability for International Application PCT/US2021/043801, Report issued Jan. 31, 2023, Mailed on Feb. 9, 2023.".
"Notice of Decision to Grant Received for China Patent Application No. 202080000213.8, Mailed on Jun. 28, 2023.".
"Notice of Decision to Grant Received for Korean Patent Application No. 10-2020-7006369, Mailed on Oct. 13, 2023.".
"Office Action received for Indonesia Patent Application No. P00202203069, Mailed on Sep. 11, 2023.".
"Office Action Received for Japan Patent Application No. 2022-607795, Mailed on Jul. 4, 2023.".
"Office Action Received for Korean Patent Application No. 10-2020-7006369, Mailed on Mar. 16, 2023.".
"Search & Written Opinion Report Received for Singapore Patent Application No. 11202201141V, Mailed on Dec. 5, 2023.".
"Third Office Action received for China Patent Application No. 202080000213.8 , Mailed on Apr. 5, 2023.".
"Supplemental Notice of Allowability Received for U.S. Appl. No. 17/862,172, mailed on Nov. 8, 2024".

* cited by examiner

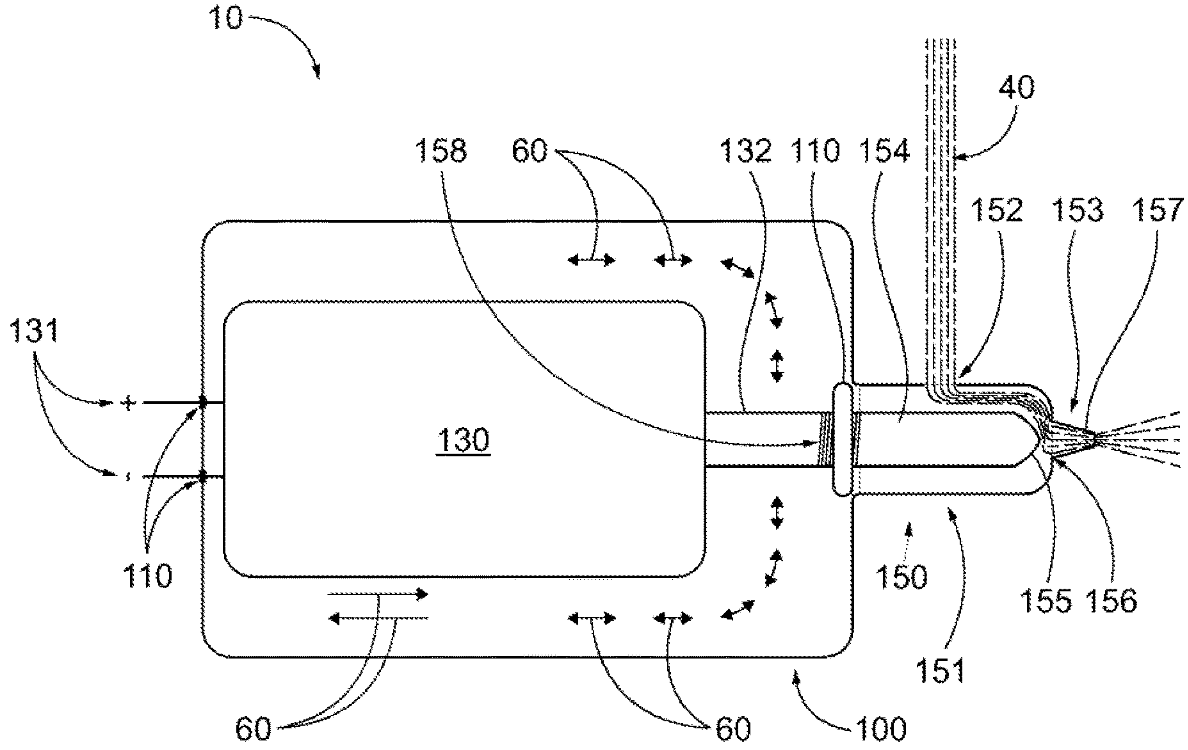
10
158
60
132
110
154
40
152
153
157
131
+
130
110
150
155
156
151
60
60
100

SYSTEM AND METHOD OF HYDROGEN FUEL INJECTION

CROSS-REFERENCE TO RELATED APPLICATIONS

This application claims priority pursuant to 35 USC. 119(e) to U.S. Provisional Patent Application Ser. No. 63/279,163, filed Nov. 14, 2021, the entire disclosure of which is incorporated herein by reference.

FIELD OF THE INVENTION

The present inventive concept relates generally to engines. More specifically, the present inventive concept is concerned with apparatuses, systems, and methods for injecting fuel into an engine, Even more specifically, the present inventive concept is concerned with apparatuses, systems, and methods for injection of fuels requiring low ignition energy and/or possessing high combustion energy, such as hydrogen.

BACKGROUND OF THE INVENTION

The use of hydrogen as a fuel in internal combustion engines has the potential to provide many benefits. Hydrogen fuel is capable of being a zero-carbon fuel and has a high energy content per unit mass. Nevertheless, hydrogen fuel is hazardous because of the low ignition energy and high combustion energy of hydrogen, and because it tends to leak easily. As such, conventional systems and methods of fuel injection do not work well with hydrogen fuel.

Therefore, it is desirable to provide apparatuses, systems, and methods for injection of fuels such as hydrogen.

SUMMARY OF THE INVENTION

The present inventive concept comprises apparatuses, systems, and methods for injection of fuels requiring low ignition energy and/or possessing high combustion energy, such as hydrogen.

An embodiment of the inventive concept comprises a fuel injection system that includes a completely sealed housing surrounding the key components of the fuel injection system. In some embodiments, the housing surrounds a bidirectional brushless servo motor. One or more orifices extend through a wall of the housing for positive and negative leads to the servo motor. In some embodiments seats or other sealing components surround the leads to prevent leakage through the orifice(s) around the leads. In some embodiments, the housing further includes a housing structure of a needle valve assembly. A drive shaft of the servo motor engages with a stem/plunger that extends into the needle valve assembly housing. Rotation of the servo motor causes the plunger to move up or down (or to the right/left as shown in FIG. 1) based on a threaded engagement between the plunger and the housing of the needle valve or the main housing. As the plunger moves down (right as shown in FIG. 1), a tapered pointed end of the plunger comes into contact with the valve seat to fully seal an orifice/nozzle at the outlet of the needle valve housing (shown on the right side in FIG. 1). In some embodiments, the valve seat is also tapered. Hydrogen fuel enters the needle valve housing through an inlet (shown at the top of the needle valve housing in FIG. 1). A seal (such as a rubber seal) surrounds the drive shaft and/or the plunger at the location in which the shaft/plunger extends from the main housing in which the servo motor is located and into the needle valve housing. This seal prevents lubricant (such as grease), that is located within the main housing for the servo motor.

The use of a brushless servo motor and sealed housing of the instant inventive concept allows for injection of fuels such as hydrogen input into an injector and out therefrom with the ability to open and close the injector (thereby fully controlling the flow of fuel) without pre-detonation or leakage.

It will be appreciated that various embodiments of the inventive concept are laid out in multiple different ways and structural arrangements. For example, in some embodiments, the servo motor shaft includes a square sleeve that surrounds and engages with the plunger of the needle valve assembly, allowing the plunger to be rotated while at the same time sliding up and down within the square shaft of the servo motor. In other embodiments, screw drive or gear drive assemblies are utilized in connection with the servo motor and needle valve assemblies.

In some embodiments, the nozzle/outlet of the needle valve assembly is positioned to inject fuel into the prechamber of an engine. In some embodiments, the nozzle/outlet of the needle valve assembly is positioned to inject fuel into the intake of a combustion engine.

It will be appreciated that other embodiments of the inventive concept include other types of motors, solenoids, or other suitable mechanisms to control the up/down (right/left, or in/out) motion of the needle valve plunger.

The foregoing and other objects are intended to be illustrative of the inventive concept and are not meant in a limiting sense. Many possible embodiments of the inventive concept may be made and will be readily evident upon a study of the following specification and accompanying drawings comprising a part thereof. Various features and subcombinations of inventive concept may be employed without reference to other features and subcombinations. Other objects and advantages of this inventive concept will become apparent from the following description taken in connection with the accompanying drawings, wherein is set forth by way of illustration and example, an embodiment of this inventive concept and various features thereof.

BRIEF DESCRIPTION OF THE DRAWINGS

A preferred embodiment of the inventive concept, illustrative of the best mode in which the applicant has contemplated applying the principles, is set forth in the instant description and is shown in the drawings.

FIG. 1 illustrates an embodiment of a fuel injection system of the inventive concept.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, an embodiment of a fuel injection system 10 of the inventive concept is shown. The system of FIG. 1 includes a sealed housing 100 surrounding a brushless servo motor 130 and defines a needle valve assembly housing 151 with a nozzle 153 designed to inject fuel 40 into an engine or prechamber. Orifices 110 extend through a wall of the housing 100 for positive and negative leads 131 to the servo motor 133. The drive shaft 132 of the servo motor 130 engages with a stem/plunger 154 that extends into the needle valve assembly housing 151. Rotation of the servo motor 130 causes the plunger 154 to move up or down (or to the right/left as shown in FIG. 1/ based on a threaded engagement 158 between the plunger 154 and the housing of the needle valve 151 or the main housing 100. As the plunger 154 moves down (right as shown in FIG. 1), a tapered pointed end 155 of the plunger 154 comes into contact with the valve seat 156 to fully seal the orifice/nozzle 153 at the outlet 157 of the needle valve housing 151 (shown on the right side in FIG. 1). In in embodiment shown in FIG. 1, the valve seat 156 is also tapered. Hydrogen fuel 40 enters the needle valve housing 15I through an inlet 152 (shown at the top of the needle valve housing in FIG. 1). A seal 110 (such as a rubber seal) surrounds the drive shaft 132 and/or the plunger 154 at the location in which the shaft/plunger extends from the main housing 100 in which the servo motor 130 is located and into the needle valve housing 151. This seal 110 prevents lubricant 60 (such as grease), that is located within the main housing 100 for the servo motor 130.

In various embodiments of the system of FIG. 1 (as well as other alternative embodiments of fuel injection systems of the inventive concept application) the nozzle/outlet 157 of the needle valve assembly 151 is positioned to inject fuel 40 into the prechamber of one of the engines described in any of the following patent applications, which are herein incorporated by reference in their entireties: U.S. patent application Ser. No. 17/389,239 filed Jul. 29, 2021; U.S. Provisional Patent Application Ser. Nos. 63/058,391, filed Jul. 29, 2020; U.S. patent application Ser. No. 16/745,184, filed Jan. 16, 2020, now U.S. Pat. No. 10,844,782; U.S. patent application Ser. No. 16/732,318, filed Jan. 1, 2020; U.S. Provisional Patent Application Ser. Nos. 62/884,771, filed Aug. 9, 2019; and 62/894,567, filed Aug. 30, 2019.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein, Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A fuel injection system comprising:
a housing surrounding key fuel injection components;
wherein said housing is completely sealed,
wherein said housing defines a in housing and a needle valve assembly housing, the needle valve assembly housing extending from the main housing in a direction away from the main housing;
wherein said key fuel injection components comprise a servo motor, the servo motor being positioned within an interior area of the main housing;
a drive shaft of the servo motor, wherein said drive shaft engages with a stem/plunger that extends into an interior area of said needle valve assembly housing; and
a seal, said seal surrounding a portion of said drive shaft at a location where said drive shaft extends from the main housing into the needle valve assembly housing.

2. The fuel injection system as claimed in claim 1 wherein said housing includes an orifice for leads to said servo motor.

3. The fuel injection system as claimed in claim 1 wherein said stem/plunger includes a tapered pointed end that engages with a valve seat at an outlet of said needle valve assembly housing.

4. The fuel injection system as claimed in claim 3 wherein said valve seat is tapered to mate with said tapered pointed end of said stem/plunger.

5. The fuel injection system as claimed in claim 1 wherein said servo motor is brushless.

6. The fuel injection system as claimed in claim 1, wherein said a drive shaft includes a square sleeve surrounding said drive shaft.

7. An engine comprising:
a fuel injection system, said fuel injection system comprising:
a housing surrounding key fuel injection components, wherein said housing is completely sealed,
wherein said housing defines a in housing and a needle valve assembly housing, the needle valve assembly housing extending from the main housing in a direction away from the main housing;
wherein said key fuel injection components comprise a servo motor, the servo motor being positioned within an interior area of the main housing;
a drive shaft of the servo motor, wherein said drive shaft engages with a stem/plunger that extends into an interior area of said needle valve assembly housing;
a seal, said seal surrounding a portion of said drive shaft at a location where said drive shaft extends from the main housing into the needle valve assembly housing; and
an intake prechamber into which said fuel injection system injects fuel.

8. The engine as claimed in claim 7 wherein said housing includes an orifice for leads to said servo motor.

9. The engine as claimed in claim 7 wherein said stem/plunger includes a tapered pointed end that engages with a valve seat at an outlet of said needle valve assembly housing.

10. The engine as claimed in claim 7 wherein said valve seat is tapered to mate with said tapered pointed end of said stem/plunger.

11. The engine as claimed in claim 7 wherein said servo motor is brushless.

12. The engine as claimed in claim 7 wherein said drive shaft that includes a square sleeve surrounding said drive shaft.

13. The fuel injection system as claimed in claim 1, wherein the rotation of the servo motor causes the stem/plunger to move in a plurality of positions based on a threaded engagement between the stem/plunger and the housing.

14. The engine as claimed in claim 7, wherein the rotation of the servo motor causes the stem/plunger to move in a plurality of positions based on a threaded engagement between the stem/plunger and the housing.

15. The fuel injection system as claimed in claim 1, wherein a first fluid is located within the interior area of the main housing, and wherein the first fluid surrounds said servo motor.

16. The fuel injection system as claimed in claim 15, wherein the first fluid is a lubricating fluid.

17. The fuel injection system as claimed in claim 16, wherein said seal prevents the first fluid located in the main housing from moving into the interior area of said needle valve assembly housing.

18. The engine as claimed in claim 7, wherein a first fluid is located within the interior area of the main housing, and wherein the first fluid surrounds said servo motor.

19. The engine as claimed in claim 18, wherein the first fluid is a lubricating fluid.

20. The engine as claimed in claim 19, wherein said seal prevents the first fluid located in the main housing from moving into the interior area of said needle valve assembly housing.

* * * * *